(No Model.)
H. CLARK.
WHIFFLETREE.
No. 296,275. Patented Apr. 1, 1884.
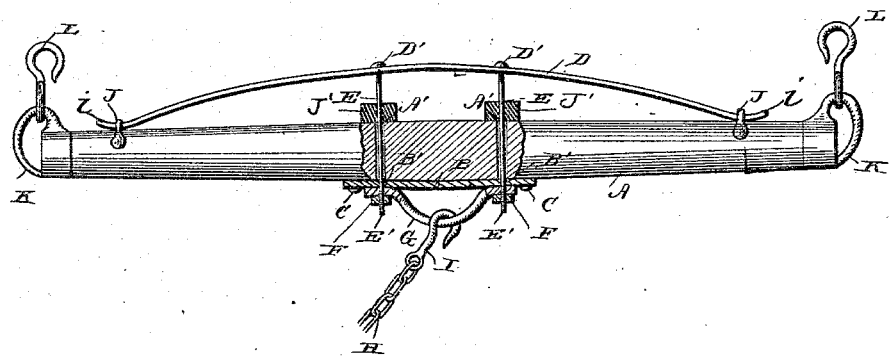
WITNESSES
Harding Clark INVENTOR
Frank A. Fouts.
Attorney

UNITED STATES PATENT OFFICE.

HARDING CLARK, OF EAST CANTON, PENNSYLVANIA.

WHIFFLETREE.

SPECIFICATION forming part of Letters Patent No. 296,275, dated April 1, 1884.

Application filed October 13, 1883. (No model.)

*To all whom it may concern:*

Be it known that I, HARDING CLARK, a citizen of the United States, residing at East Canton, in the county of Bradford and State of Pennsylvania, have invented certain new and useful Improvements in Whiffletrees, of which the following is a specification, reference being had therein to the accompanying drawing.

My invention relates to a spring for a whiffletree; and it consists in the parts which will be hereinafter described, and pointed out in the claim.

The view in the accompanying drawing represents a plan of my spring and its connecting parts secured to a whiffletree, a part of said whiffletree being broken away, whereby the arrangement and location of the bolts in the whiffletree-openings are shown.

The letter A represents the whiffletree provided with parallel openings A', and B is a plate secured thereto by bolts C. B' B' are openings in said plate, adapted to admit the bolts E.

D is the bow-spring, fixed to bolts E by the heads D'.

E' are the threaded ends of bolts E. By means of the threaded ends E' and nuts F the slack may be taken from the spring D when said spring becomes weak from use.

G is a semicircular bar having side projections, provided with openings through which the bolts pass. Said bar is secured on the bolts by the nuts F.

H is a draft-chain provided with hook I.
Said hook engages the bar G.

J J are loops or straps secured to the whiffletree. The ends of the spring D pass under said straps, and slide longitudinally therein when the spring is depressed or raised.

K represents the links or loops on the ends of the whiffletree, to which the trace-hooks L are secured. When the spring D loses its resiliency from usage, the nuts F can be screwed farther on the bolts E, thereby restoring the efficiency of said spring.

J J are rubber springs suitably secured to the whiffletree. These springs are provided with openings for the bolts E to play through. These rubbers are secondary or supplementary springs, to relieve the main spring D when a heavy load is being drawn.

The spring mechanism herein shown and described is adapted to relieve the whiffletree and other connected parts from the jerk or sudden strain incident to a quick start. The draft-chain, being connected to the cross-bar G, draws the bolts partly through the whiffletree when the horses are started, and thereby depresses the spring and prevents the jerk. The bolts E move freely through the whiffletree-openings A' and plate-openings B'.

Having thus described my invention, I claim as new and desire to secure by Letters Patent—

The whiffletree herein described, consisting of the body A, having the loops J, the spring D, having the hooks *l* secured in said loops, the openings A' in the body, the packing J', the bolts D', passing through said packing and openings, and the draft-bar G, with its attachments for operating said spring, as shown and described.

In testimony whereof I affix my signature in presence of two witnesses.

HARDING CLARK.

Witnesses:
   MIAL E. LILLEY,
   E. R. COLWELL.